(12) United States Patent
Karl et al.

(10) Patent No.: US 6,451,100 B1
(45) Date of Patent: Sep. 17, 2002

(54) AQUEOUS CARBON BLACK DISPERSIONS

(75) Inventors: Alfons Karl, Gründau; Horst Kleinhenz, Grosskrotzenburg; Werner Kalbitz, Rodenbach; Johann Mathias, Kahl; Gerd Tauber, Seligenstadt; Andreas Stübbe, Aschaffenburg, all of (DE)

(73) Assignee: Degussa-Huls AG, Frankfurt am Main (DE)

( * ) Notice: Subject to any disclaimer, the term of this patent is extended or adjusted under 35 U.S.C. 154(b) by 0 days.

(21) Appl. No.: 09/625,203

(22) Filed: Jul. 21, 2000

(30) Foreign Application Priority Data

Jul. 21, 1999 (DE) .......................................... 199 34 281

(51) Int. Cl.$^7$ ........................... C09D 11/00; C09D 11/02
(52) U.S. Cl. ................. 106/31.9; 106/31.65; 106/31.75
(58) Field of Search ............................. 106/31.9, 31.75, 106/31.65

(56) References Cited

U.S. PATENT DOCUMENTS 5,919,294 A * 7/1999 Hirasa et al. .............. 106/31.9
5,993,527 A * 11/1999 Tochihara et al. ........ 106/31.85
6,171,382 B1 * 1/2001 Stubbe et al. .............. 106/31.9

* cited by examiner

*Primary Examiner*—Helene Klemanski
*Assistant Examiner*—Veronica F. Faison
(74) *Attorney, Agent, or Firm*—Pillsbury Winthrop LLP

(57) ABSTRACT

Aqueous carbon black dispersions contain carbon black and cationic surfactants in addition to water. The aqueous carbon black dispersions are produced by dispersing the carbon black and other components in water with bead mills, ultrasonic mills or an Ultra Turrax mixer. The dispersions can be used to produce inks, lacquers and printing inks.

11 Claims, No Drawings

AQUEOUS CARBON BLACK DISPERSIONS

CROSS-REFERENCE TO RELATED APPLICATION

This application relates to German Application DE 199 34 281.4, filed Jul. 21, 1999, which disclosure is incorporated herein by reference.

FIELD OF THE INVENTION

The invention concerns aqueous, cationically stabilized carbon black dispersions, a method of their production and their use.

BACKGROUND OF THE INVENTION

Aqueous carbon black dispersions are used in formulations for printing inks and also directly as inks, for example, in inkjet printers.

The inkjet printing method is a known reproducing technology in which the printing ink is transferred without pressure, that is, without contact of the print head with the print medium. Droplets of ink are sprayed from a jet or nozzle onto a receiving material during which deflection of the droplets can be electronically controlled. This technology, also known as pressureless printing, is particularly suitable for printing products having irregular surfaces and packaging because there is a certain distance between the print head and the printed material. The printing method is very flexible and relatively economical and is therefore also used in computer printing, for example, as a workplace printer. The inkjet method is also increasingly used in the industrial field, for example, in outside advertising. In outside advertising, the ink must meet special requirements of light-fastness and water resistance. In addition, the coloring components must be very finely divided in order to prevent the printing jets from clogging. Both dyes as well as, more recently, pigments have been used as coloring substances. Pigments have advantages over dyes in that the light-fastness of pigments is very high and that pigments are water-resistant. Pigments have a disadvantage in comparison to dyes, namely that they only form stable dispersions with a long storage life when treated with surface-active substances (surfactants). Pigment particles are not present in the form of primary particles but rather in the form of aggregates. Pigment aggregates are larger than soluble dyes. If pigment aggregates are not sufficiently finely dispersed, they clog the jets of printing heads. Moreover, large aggregates alter the light absorption properties of pigment black. The result is a graying of the print and a loss of covering power.

Early patents that disclose the use of carbon blacks as pigment blacks in inkjet inks are U.S. Pat. Nos. 5,085,698 and 5,320,668. the use of water-soluble acrylates for pigment stabilization is described therein.

The production of aqueous carbon black dispersions with carbon blacks having an average primary particle size of not greater than 30 nm and a DBP No. of at least 75 ml/100 g is known (U.S. Pat. No. 5,538,548).

The production of aqueous carbon black dispersions using water-soluble organic solvents and water-soluble acrylic resins is also known (U.S. Pat. No. 5,609,671).

A disadvantage of the known aqueous carbon black dispersions is running or bleeding after the dispersions have been sprayed onto a carrier. Commercial dispersions have zeta potentials <0 mV. A purposeful flocculation of the dispersion during or after its application onto the carrier can be readily achieved by positive surface charging of the dispersed particles (zeta potentials >0 mV), which counteracts bleeding.

SUMMARY OF THE INVENTION

It is an object of the invention problem to produce carbon black dispersions that do not have the disadvantages mentioned above and that, in addition, are stable during storage.

The invention has as its subject matter aqueous carbon black dispersions containing the following components in addition to water, relative to the total dispersion:

Carbon black: 1 to 45% by weight, preferably 5 to 25% by weight; and

Cationic surfactant: 1 to 40% by weight, preferably 5 to 25% by weight,

Compounds with the following formula can be used as cationic surfactants:

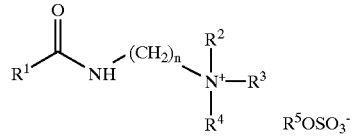

$R^1$—COOH: ricinoleic acid $R^2$, $R^3$, $R^4$: may be identical or different and may consist of $C_1$ to $C_5$ alkyl groups, or

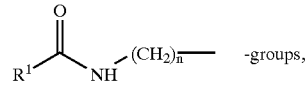 -groups, $R^5$: $C_1$ to $C_5$ alkyl groups, n: natural number 1–5,

In one embodiment, the cationic surfactant can be a wetting agent combination or carbon blacks with an average primary particle size of 8 to 80 nm, preferably 10 to 35 nm and a DBP number of 40 to 200 ml/100 g, preferably 60 to 150 ml/100 g can be used as the pigment carbon black. Pigment carbon blacks produced by means of furnace black methods, gas black methods, channel black methods or flame black methods can be used as pigment carbon blacks. Examples thereof are color black FW 200, color black FW 2, color black FW 2 V, color black FW 1, color black FW 18, color black S 170, color black S 160, special black 6, color black 5, color black 4, color black 4A, Printex 150 T, Printex U, Printex V, Printex 140 U, Printex 140 V, Printex 95, Printex 90, Printex 85, Printex 80, Printex 75, Printex 55, Printex 45, Printex 40, Printex P, Printex 60, Printex XE 2, Printex L 6, Printex L, Printex 300, Printex 30, Printex 3, Printex 35, Printex 25, Printex 200, Printex A, Printex G, color black 550, color black 350, color black 250, color black 100, made by Degussa-Hüls AG, Germany. In a preferred embodiment of the invention gas blacks can be used.

The carbon black dispersed in the dispersion can have an average particle size of 50 to 250 nm in an embodiment of the invention.

Further subject matter of the invention comprises a method of producing an aqueous carbon black dispersion that is characterized in that carbon black is dispersed together with a wetting agent or wetting agents in water and that bead mills, ultrasonic devices or an Ultra-Turrax Mixer are used, if necessary, for dispersal. Following dispersal, the carbon black dispersion can be centrifuged or filtered.

The pH of the dispersions can be in the acidic range, preferably in the pH range of 1–4.

The dispersions in accordance with the invention have a very high flocculation stability at an acidic pH and therefore have a high stability during storage.

The carbon black dispersions in accordance with the invention have conventional optical density.

The aqueous carbon black dispersions in accordance with the invention can be used for producing inks, lacquers and printing inks, in particular inks for inkjet printers.

DETAILED DESCRIPTION OF THE INVENTION

EXAMPLES

The carbon black dispersions in accordance with the invention are produced as follows:
1. Preparation of the Wetting Agent Solution Water is placed in a receiver and REWOQUAT RTM 50, a cationic wetting agent made by Witco Company, is stirred into the water.
2. Working in the Carbon Black The carbon black is worked gradually into the prepared wetting agent solution with slow agitation, either by hand or with a slow agitator.
3. Dispersal Ultrasonic devices may be used.

The dispersion prepared according to paragraph 2, above, is homogenized with a high-performance mixer (e.g., an Ultra Turrax mixer) and dispersed with an ultrasonic device. Very coarse particles can be separated from the dispersion obtained in this manner, using a centrifuge.

The composition of the aqueous carbon black dispersions as well as their properties are given in Table 1. Table 1 also shows that the aqueous carbon black dispersions in accordance with the invention have good stability in storage.

TABLE 1

| Example No.<br>Dispersal: Ultrasound | 1 | 2 |
|---|---|---|
| Constituents | | |
| PRINTEX 90 | 15 | — |
| Color black FW 18 | — | 15 |
| REWOQUAT RTM 50 | 12 | 12 |
| Water | 73 | 73 |
| Total | 100 | 100 |
| Surface tension mN/m | 38.2 | 37.7 |
| Average particle size nm | 101 | 125 |
| Optical density (5% black/15% TEG) | 1.46 | 1.49 |
| My | 148 | 152 |
| Mc | 145 | 151 |
| Zeta potential mV | +32 | +30 |
| pH | 2.7 | 2.3 |
| Stability | | |
| Viscosity, 1 day cPs | 25 | 25 |
| Viscosity, 28 days cPs | 84 | 34 |

The surface tension is determined by the plate (sheet) method according to DIN 53 914 (3/80) at 20° C. The surface tension of the carbon black dispersion is significant insofar as a high surface tension has a positive influence on the formation of droplets leaving the jet in the inkjet process.

The zeta potential is determined with an MBS-8000 of the Matec Company. The specimens are measured undiluted. The zeta potential is determined by electrokinetic sound amplitude (ESA). The zeta potential, which characterizes the charge state of the particle surface, provides information about the wetting agent to be used for stabilization. In the case of cationic wetting agents, the zeta potential is greater than 0 mV, preferably greater than or equal to 10 mV. In the case of non-ionic wetting agents the zeta potential is usually approximately $\leq 0$ mV.

The distribution of particle size is determined by means of dynamic light scatter (photon correlation spectroscopy, PCS). A photon correlation spectrometer NICOMP N370 (Hiac/Royco Company) is used as the spectroscopy device. The measurement takes place in ultrapure water. The evaluation takes place by means of Gauss distribution analysis (volume distribution).

The optical density is determined with a Mcbeth RD 918 densitometer on test prints produced on a 660 C Hewlett-Packard printer.

The stability test is carried out as follows:

The dispersion is stored 28 days at room temperature, then frozen down to –30° C. and heated up to 70° C.

Examples 1 and 2 show a high flocculation stability and therewith a high stability in storage apparent from the low rise of viscosity over 28 days (room temperature) and from the high zeta potential. The color values are in the normal range. The particle sizes in the dispersion are at the level of aggregate size and are thus an indication for a good dispersion stability by means of the cationic wetting agent.

The viscosity measurements are carried out with a Brookfield model DV II.

The components used in the production of the carbon black dispersions are characterized as follows:

The carbon black PRINTEX 90 is a furnace black with an average primary particle size of 14 nm and a DBP absorption of 95 ml/100 g.

The carbon black designated color black FW 18 is a gas black with an average primary particle size of 15 nm.

REWOQUAT RTM 50 is a cationic wetting agent.

Producer: Witco Company

Substance group: ricinoleic acid propylamido trimethylammonium methosulfate

Formula:

$$R^1-\underset{\underset{NH}{}}{\overset{O}{C}}-(CH_2)_3-\underset{\underset{CH_3}{|}}{\overset{CH_3}{\overset{|}{N^+}}}-CH_3 \quad CH_3OSO_3^-$$

$R^1$—COOH: Ricinoleic acid

What is claimed is:

1. An aqueous carbon black dispersion comprising
water,
1 to 45% by weight carbon black, relative to total dispersion weight, and
1 to 40% by weight cationic surfactant, relative to total dispersion weight,
wherein the cationic surfactant comprises a compound of formula:

$$R^1-\underset{\underset{NH}{}}{\overset{O}{C}}-(CH_2)_n-\underset{\underset{R^4}{|}}{\overset{R^2}{\overset{|}{N^+}}}-R^3 \quad R^5OSO_3^-$$

wherein
$R^1$—COOH represents ricinoleic acid;
$R^2, R^3, R^4$ may be identical or different substituents and are selected from the group consisting of $C_1$ to $C_5$ alkyl groups; and

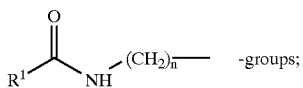 -groups;

$R^5$ represents $C_1$ to $C_5$ alkyl groups; and n represents a natural number 1–5.

2. The aqueous carbon black dispersion according to claim 1, wherein the carbon black comprises a pigment black with an average primary particle size of 8 to 80 nm and a DBP No. of 40 to 200 ml/100 g.

3. The aqueous carbon black dispersion according to claim 1, wherein the carbon black dispersed in the aqueous carbon black dispersion has an average particle size of 50 to 250 nm.

4. The aqueous carbon black disersion according to claim 1, wherein the carbon black is present in an amount of 5 to 25% by weight relative to the total dispersion weight.

5. The aqueous carbon black dispersion according to claim 1, wherein the cationic surfactant is resent in an amount of 5 to 25% by weight relative to total dispersion weight.

6. The aqueous carbon black dispersion according to claim 1, wherein the cationic surfactant comprises a wetting agent combination or a mixture of at least two cationic wetting agents.

7. A method of producing an aqueous carbon black dispersion according to claim 1, comprising:

dispersing the carbon black and the cationic surfactant in water using, optionally, a member selected from the group consisting of bead mills, ultrasonic devices and an Ultra Turrax mixer.

8. A method of producing the aqueous carbon black dispersion according to claim 7, wherein the aqueous carbon black dispersion is centrifuged or filtered following the dispersing step.

9. A composition comprising the aqueous carbon black dispersion according to claim 1, wherein said composition comprises a member selected from the group consisting of inks and lacquers.

10. A composition according to claim 9, wherein the inks comprise printing inks.

11. A composition according to claim 10, wherein the inks comprise inks for inkjet printers.

* * * * *